R. C. COTTON.
TROLLEY HEAD.
APPLICATION FILED MAY 18, 1912.
1,055,140.
Patented Mar. 4, 1913.
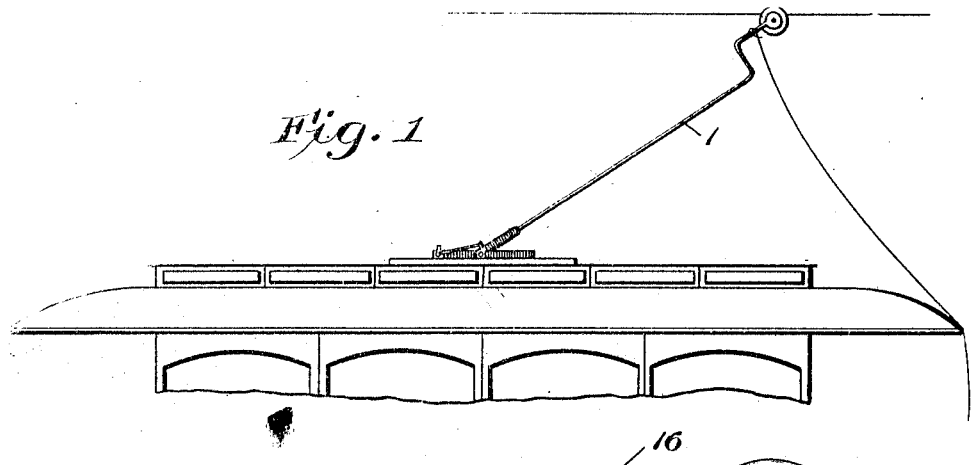
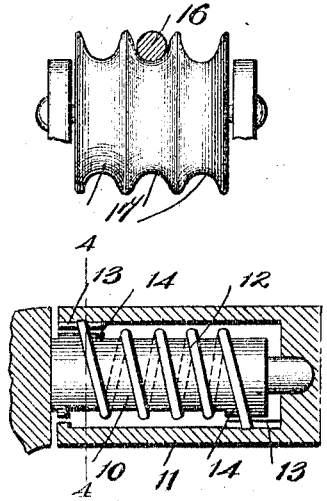
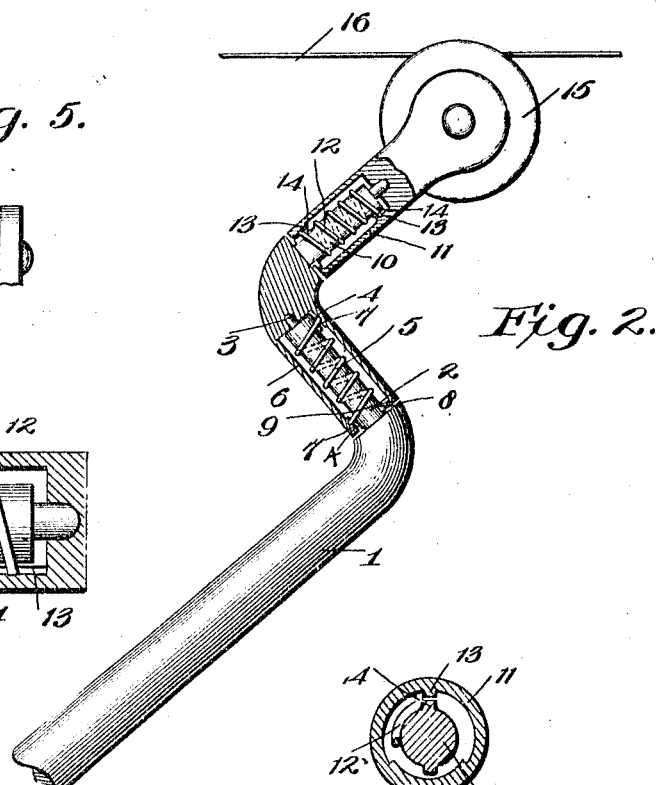
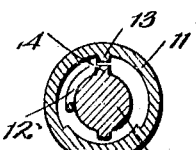
Witnesses
H. W. Primm
Byron B. Collings
Inventor
R. C. Cotton.
by Wilkinson, Fisher
& Witherspoon
his Attorneys.

UNITED STATES PATENT OFFICE.

ROBERT C. COTTON, OF THE UNITED STATES ARMY.

TROLLEY-HEAD.

1,055,140.     Specification of Letters Patent.     Patented Mar. 4, 1913.

Application filed May 18, 1912. Serial No. 698,257.

*To all whom it may concern:*

Be it known that I, ROBERT C. COTTON, lieutenant, U. S. Army, a citizen of the United States, residing at Quincy, in the county of Adams and State of Illinois, have invented certain new and useful Improvements in Trolley-Heads; and I do hereby declare the following to be a full, clear, and exact description of the invention, such as will enable others skilled in the art to which it appertains to make and use the same.

My invention relates to improvements in trolley heads, and it consists in the constructions, combinations and arrangements herein described and claimed.

An object of my invention is to provide an improved trolley head, in which the trolley wheel is yieldingly supported in position for independent movement in two perpendicular planes extending angularly to the trolley wire.

A further object of my invention is to provide a strong and durable trolley head for efficiently maintaining contact with the trolley wire under all practical conditions, and in which all parts are protected against injury or the entrance of dirt.

In the accompanying drawings forming a part of this application, and in which similar reference symbols indicate corresponding parts in the several views:—Figure 1 is a side elevation illustrating one embodiment of my invention applied to a trolley car; Fig. 2 is a detail elevation, showing my improved construction partly in section; Fig. 3 is an enlarged detail section of one of the rotatable members shown in Fig. 2; Fig. 4 is a section on the line 4—4 of Fig. 3; and Fig. 5 is an elevation of the trolley wheel shown in Fig. 2.

Referring to the drawing, 1 indicates a trolley pole carrying a spindle 2 extending perpendicularly thereto and provided with an axially-extending pivot 3 and with lugs 4 constituting bearing stops for the ends of a spiral spring 5. A member 6 is rotatably mounted on the spindle 3 and lugs 4, and provided with diametrically opposite lugs 7 bearing against the ends of said spring 5; the spring ends being preferably flattened, or offset radially for securely engaging said lugs 4 and 7 for yieldingly maintaining the rotatable member 6 in normal position and resisting rotation thereof in either direction. The spindle 2 and member 6 are shown provided with additional coöperating lugs 8 and 9, to insure a firm bearing for said rotatable member.

The member 6 carries a spindle 10 extending perpendicularly to the spindle 2, for rotatably supporting a member 11; rotation of said member 11 in either direction being yieldingly resisted by a spring 12 engaging lugs 13 and 14 on said member and spindle in the manner just described in reference to the rotatable member 6. A trolley wheel 15 is journaled on said member 11 in position for engaging the usual trolley wire 16; said rotatable members 6 and 11 yieldingly supporting said wheel for universal movement to insure the maintenance of an efficient contact with the trolley wire under all practical conditions. If desired, the trolley wheel may be provided with a series of grooves 17 for engaging the trolley wire, or a plurality of independent grooved wheels may be employed. I preferably employ a construction having an odd number of such grooves positioned symmetrically to the axis of the wheel-carrying member 11, in order to provide a central groove of the series for normally engaging the trolley wire.

I have illustrated and described preferred and satisfactory constructions, but changes could be made within the spirit and scope of my invention.

I claim:—

1. In a trolley head, the combination of a spindle extending perpendicularly from the trolley pole, a hollow member rotatably supported about said spindle, a spindle extending perpendicularly from said hollow member, a hollow wheel-carrying member rotatably supported about said last spindle, a coil spring encircling each of said spindles, and coöperating lugs on said spindles and hollow members for engaging the respective ends of said coil springs.

2. In a trolley head, the combination of a spindle extending perpendicularly from the trolley pole and terminating in a reduced axial pivot, a hollow member rotatably mounted on said pivot about said spindle, a spindle extending perpendicularly from said hollow member and terminating in a reduced axial pivot, a hollow wheel-carrying member rotatably mounted on said last pivot about said spindle, a coil spring encircling each of said spindles, and coöperating lugs on said spindles and hollow members for engaging the respective ends of said coil springs.

In testimony whereof, I affix my signature, in presence of two witnesses.

ROBERT C. COTTON.

Witnesses:
HENRY E. SCHMIEDESKAMP,
ALMA CONRAD.